United States Patent [19]

Alexander et al.

[11] Patent Number: 4,542,000
[45] Date of Patent: Sep. 17, 1985

[54] METHOD FOR TREATING GAS STREAMS

[75] Inventors: Jeffery C. Alexander, Essex; Karim Zahedi, Newton, both of Mass.

[73] Assignee: EFB, Inc., Woburn, Mass.

[21] Appl. No.: 575,148

[22] Filed: Jan. 30, 1984

[51] Int. Cl.⁴ .................. C01B 17/00; C09K 3/00
[52] U.S. Cl. ........................... 423/244; 252/192; 55/73
[58] Field of Search .......... 423/242 A, 242 R, 244 A, 423/244 R; 55/73; 252/192

[56] References Cited

U.S. PATENT DOCUMENTS

| | | | |
|---|---|---|---|
| 1,120,475 | 12/1914 | Hall | 423/224 |
| 1,895,601 | 1/1933 | Beuthner | 55/79 |
| 2,478,757 | 8/1949 | Foster | 25/156 |
| 2,547,042 | 4/1951 | Pole | 117/65 |
| 2,551,905 | 5/1951 | Robinson | 423/244 |
| 2,718,453 | 9/1955 | Beckman | 23/2 |
| 2,780,310 | 2/1957 | Schaub | 183/114.2 |
| 3,154,682 | 10/1964 | Hartz et al. | 250/44 |
| 3,330,096 | 7/1967 | Zimmerley | 55/73 |
| 3,411,864 | 11/1968 | Pallinger | 23/2 |
| 3,411,865 | 11/1968 | Pijpers et al. | 23/2 |
| 3,519,471 | 7/1970 | Ban | 117/100 |
| 3,526,081 | 9/1970 | Kusters | 55/127 |
| 3,563,704 | 2/1971 | Torrence | 23/178 |
| 3,717,976 | 2/1973 | Gappa et al. | 55/73 |
| 3,926,587 | 12/1975 | Squires | 55/12 |
| 3,976,446 | 8/1976 | Sims | 55/73 |
| 3,982,326 | 9/1976 | Squires | 34/22 |
| 4,004,350 | 1/1977 | Squires | 34/33 |
| 4,004,885 | 1/1977 | Groenendaal et al. | 23/260 |
| 4,023,939 | 5/1977 | Jüntgen et al. | 55/73 |
| 4,049,399 | 9/1977 | Teller | 55/73 |
| 4,066,526 | 1/1978 | Yeh | 204/186 |
| 4,083,701 | 4/1978 | Noack | 55/20 |
| 4,102,980 | 7/1978 | Sasaki et al. | 423/239 |
| 4,115,518 | 9/1978 | Delmon et al. | 423/244 |
| 4,120,645 | 10/1978 | Heian et al. | 423/106 |
| 4,149,858 | 4/1979 | Noack et al. | 55/73 |
| 4,164,555 | 8/1979 | Steiner | 423/569 |
| 4,178,349 | 12/1979 | Wienert | 423/244 |
| 4,179,399 | 12/1979 | Lichtenberger et al. | 252/411 S |
| 4,181,704 | 1/1980 | Sheer et al. | 423/230 |
| 4,191,115 | 3/1980 | Yang et al. | 110/347 |
| 4,197,285 | 4/1980 | Yang et al. | 423/638 |
| 4,201,695 | 5/1980 | Jüntgen et al. | 252/411 R |
| 4,203,736 | 5/1980 | Berz | 55/96 |
| 4,214,878 | 7/1980 | Weiss | 55/96 |
| 4,220,478 | 9/1980 | Schuff | 106/281 R |
| 4,225,572 | 9/1980 | Shen et al. | 423/638 |
| 4,248,612 | 2/1981 | Wakabayashi et al. | 55/350 |
| 4,273,750 | 6/1981 | Hollett, Jr. et al. | 423/244 |
| 4,302,218 | 11/1981 | Friedman | 48/197 R |
| 4,302,221 | 11/1981 | Tanaka | 55/60 |
| 4,308,036 | 12/1981 | Zahedi et al. | 55/6 |
| 4,316,813 | 2/1982 | Voss | 252/189 |
| 4,338,112 | 7/1982 | Propster | 65/27 |
| 4,338,113 | 7/1982 | Hohman et al. | 65/27 |
| 4,349,367 | 9/1982 | Krumwiede | 65/27 |
| 4,374,652 | 2/1983 | Zahedi et al. | 55/6 |

OTHER PUBLICATIONS

Panel Bed Filters for Simultaneous Removal of Fly Ash and Sulfur Dioxide—Arthur M. Squires and Robert Pfeffer: Journal of the Air Pollution Control Association, Aug. 1970, vol. 20, No. 8, pp. 534–538.

Primary Examiner—Gregory A. Heller
Attorney, Agent, or Firm—Shapiro and Shapiro

[57] ABSTRACT

A gaseous constituent, such as sulfur dioxide, is removed from a gas stream in a granular bed filter containing granules coated with a sorbent material which is reactive with the gaseous constituent. Granules carrying reacted sorbent material are removed from the granular bed filter, cleaned of reacted sorbent material and coated with further sorbent material for reuse in the granular bed filter. Electrification of the filter bed permits simultaneous, highly efficient removal of particulates entrained in the gas stream.

15 Claims, 6 Drawing Figures

U.S. Patent  Sep. 17, 1985  4,542,000
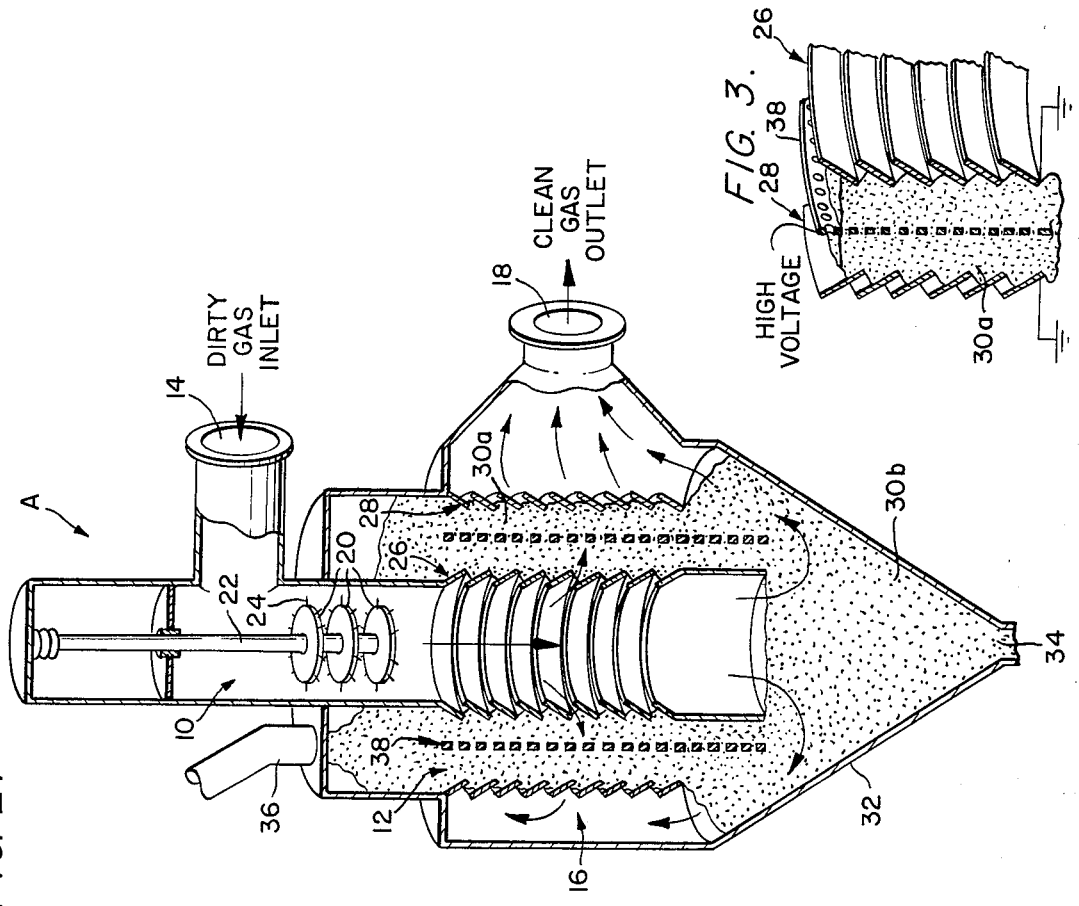
FIG. 2.
FIG. 3.
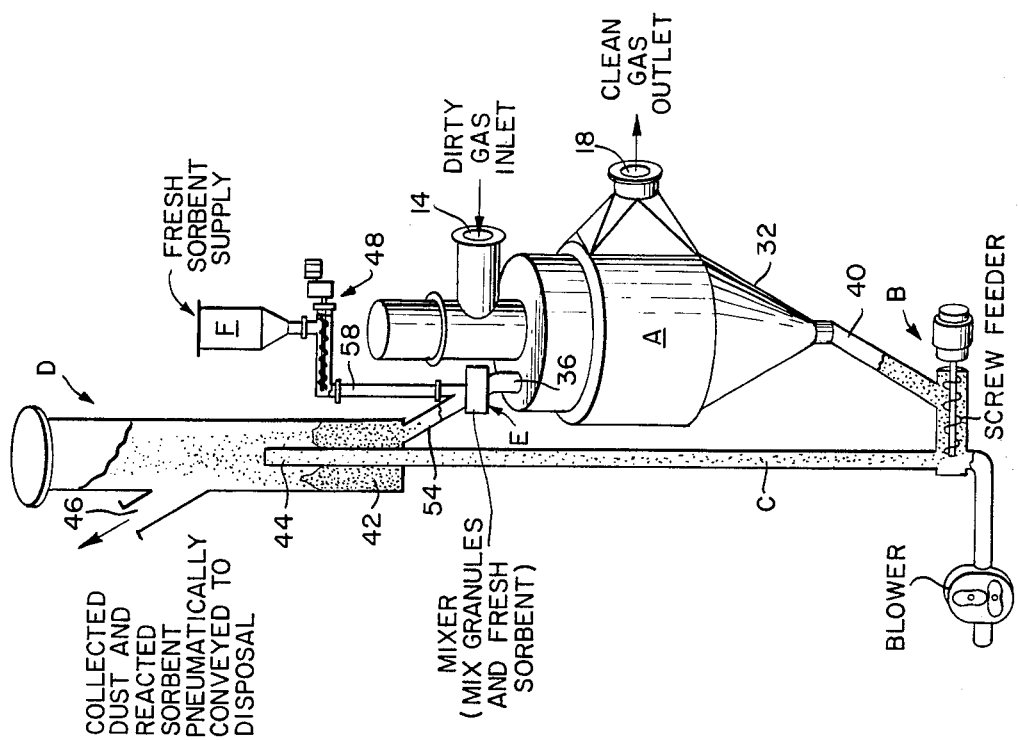
FIG. 1.

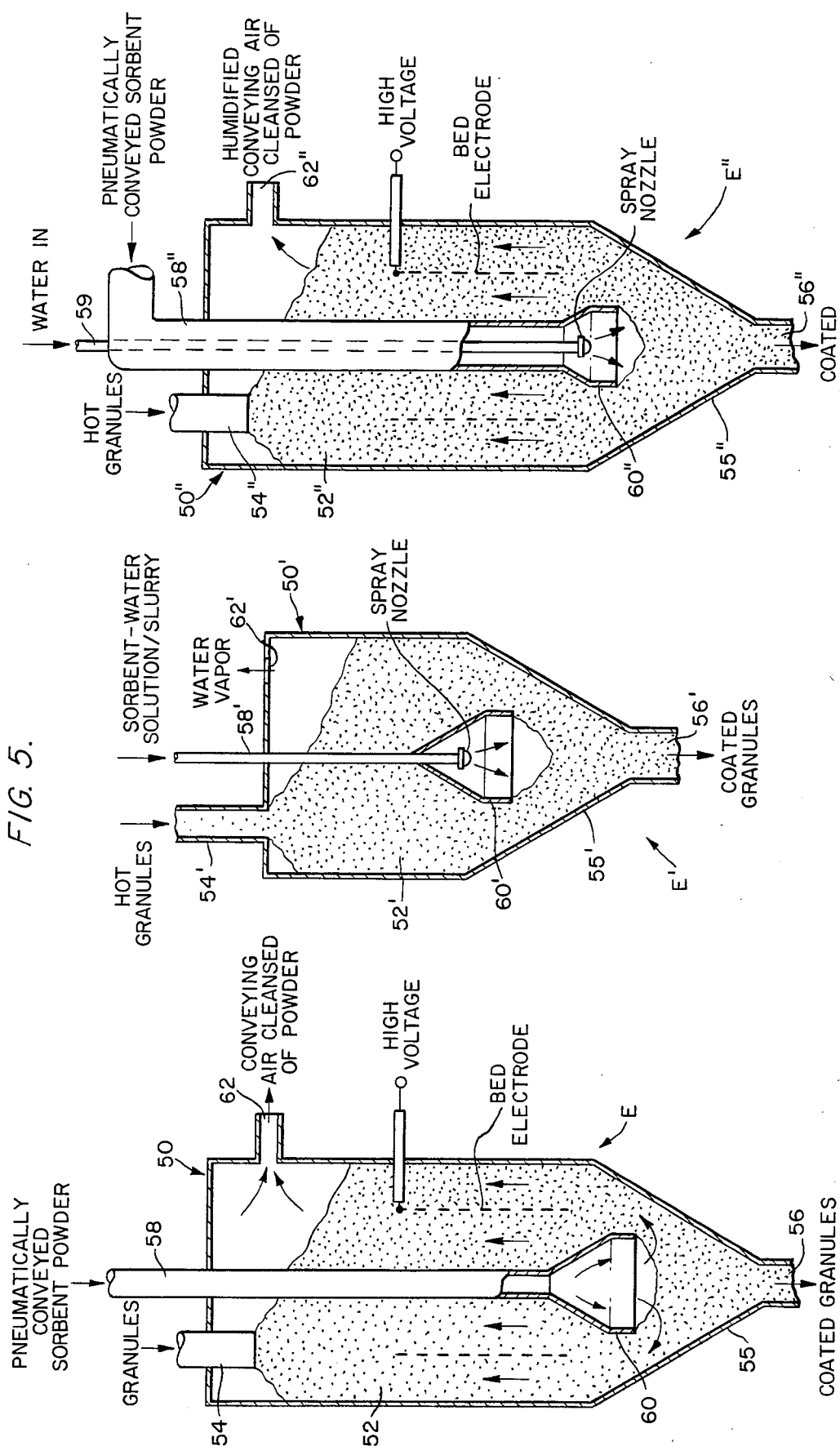

METHOD FOR TREATING GAS STREAMS

BACKGROUND OF THE INVENTION

This invention relates to the treatment of gas streams and is more particularly concerned with the removal of pollutants from waste gases associated with industrial and utility processes. Within its general scope of applicability, the invention is especially useful, for example, in the removal of sulfur compounds (e.g., gaseous $SO_2$) from waste gases generated by the combustion of sulfur-bearing fossil fuels in boilers and the like.

Since the establishment of government standards restricting atmospheric emissions from stationary sources, industry has continually strived to devise effective emission control technologies which are both economical and operationally practical. In the case of certain classes of emissions, numerous technical problems have made this task a particularly onerous one which engineers have managed to meet with only limited success. Gaseous $SO_2$ emissions from industrial and utility boilers, which have been regulated for over 10 years, are exemplary in this regard. With respect to utility installations, for instance, flue gas desulfurization still remains a serious financial obstacle to the construction of new coal-fired facilities and the conversion of existing oil-fired facilities to coal, despite the considerable effort which has been expended in attempts to solve this problem.

Nearly all flue gas desulfurization schemes proposed heretofore have been based upon a chemical reaction between the $SO_2$ constituent of the flue gas stream and a sorbent material (usually an alkali) with which the gas stream is contacted to form a solid or water soluble residue which can be collected for disposal. Due largely to cost considerations, sodium and calcium-based sorbent materials have been the most widely applied in practice. As it is generally recognized that the reaction of $SO_2$ with sodium and calcium-based sorbents proceeds more quickly when both are dispersed in water, wet flue gas scrubbing systems have dominated industry practice to date. However, while wet scrubbers are indeed capable of adequate $SO_2$ control, they are nonetheless subject to significant disadvantages. For example, the fluid and residue handling requirements of wet scrubbers generally necessitate overall systems which are quite complex as well as impractical for utility-scale application. Thus, efforts have continued toward the development of practical alternatives.

In a broad sense, dry sorbent injection systems represent perhaps the most attractive alternative to wet scrubbers among previously known flue gas desulfurization techniques. The potential operational and cost advantages of this approach (which basically involves the injection of finely divided dry sorbent material directly into a flue gas stream) are readily apparent, as the need for water or the like is eliminated while advantage can still be taken of less expensive sorbent materials. Unfortunately, attempts to implement dry sorbent injection technology have, by and large, proved disappointing—primarily due to physical limitations on reaction kinetics. Recent attempts at dry injection in conjunction with baghouse dust collectors have provided some encouraging results, but this approach still faces significant technical problems and has yet to be proven commercially feasible.

SUMMARY OF THE INVENTION

According to the present invention, it has been discovered that effective control of $SO_2$ as well as other pollutants can be achieved through an entirely different approach to dry sorbent reaction which is both economical and operationally practical. Generally speaking, the invention relates to the treatment of gas streams using granular bed filters, devices which are well known in the art and commercially proven (especially in connection with the removal of particulate pollutants such as fly ash and the like). More particularly, it has been found in accordance with the invention that by passing a waste gas stream through a granular bed filter which contains granules coated with a thin layer of sorbent material, an undesired gaseous constituent can be removed from the gas stream with remarkable efficiency. The gaseous constituent is removed by reaction with the sorbent coating on the bed granules which forms a residue that is retained in the filter bed. As will become apparent hereinafter, the present invention overcomes the various problems associated with dry injection sorbent reaction systems and further provides the additional capability of simultaneous, highly efficient removal of particulates entrained in the gas stream by virtue of the use of granular bed filters. The invention thus offers significant advantages in regard to both equipment costs and overall system operation.

Accordingly, in one of its broad aspects, the invention provides a method of treating a gas stream, comprising providing a granular bed filter, supplying to the bed of the filter granules coated with a sorbent material which is reactive with a gaseous constituent of the gas stream and passing the gas stream through the granular bed filter. According to a preferred form of the invention, the method may further include removing granules from the bed of the granular bed filter after a portion of the gas stream has been in contact with the sorbent material, removing reacted sorbent material from the removed granules, coating the removed granules with further sorbent material and feeding them back to the granular bed filter.

According to another broad aspect of the invention, apparatus for treating a gas stream is provided, which comprises a granular bed filter adapted for the passage of the gas stream therethrough, the filter including a granular bed containing granules coated with a sorbent material which is reactive with a gaseous constituent of the gas stream. The apparatus, according to a further aspect of the invention, may also include means for removing granules from the bed of the filter, means for removing reacted sorbent material from the removed granules, means including a further granular bed for coating the last mentioned granules with further sorbent material and means for supplying those granules from the further bed to the filter bed.

Other aspects of the invention pertain, inter alia, to electrification of the granules in the filter bed for simultaneous removal of particulates entrained in the gas stream, methods and apparatus for coating the bed granules with sorbent material and specific applications of the invention in the treatment of gas streams containing gaseous $SO_2$.

The foregoing and other aspects of the invention as well as its many advantages will be more fully appreciated from the detailed description of the invention hereinafter in which reference is had to the following drawings.

BRIEF DESCRIPTION OF THE DRAWINGS

FIG. 1 is a diagrammatic representation of apparatus for treating a gas stream in accordance with the invention;

FIG. 2 is a diagrammatic view, shown partly in section, of a granular bed filter of a preferred type for use in the apparatus of FIG. 1;

FIG. 3 is an explanatory diagram;

FIG. 4 is a diagrammatic view, shown partly in section, of apparatus for coating granules in accordance with the invention;

FIG. 5 is a view similar to FIG. 4, showing a second form of apparatus for coating granules in accordance with the invention; and FIG. 6 is another view similar to FIG. 4, showing a third form of apparatus for coating granules in accordance with the invention.

DETAILED DESCRIPTION OF THE INVENTION

FIG. 1 shows preferred apparatus for carrying out a method of treating a gas stream in accordance with the invention, including a granular bed filter A and various peripheral components B–F which will be discussed in more detail shortly. As in the illustrated embodiment, it is preferable for economic and performance reasons that the granular bed filter A be of the electrified moving bed type as described, for example, in U.S. Pat. Nos. 4,308,036 or 4,374,652 (both issued to the assignee hereof) or in co-pending U.S. patent application Ser. No. 507,947 filed June 24, 1983 (assigned to the same assignee), all hereby incorporated by reference. However, certain advantages of the invention may be obtained by using other types of granular bed filters. For the purposes hereof, a granular bed filter of the type described in the aforementioned U.S. patent application has been assumed and is shown diagrammatically in FIG. 2. For the convenience of the reader, the basic characteristics of the granular bed filter A will now be generally described.

Broadly speaking, as shown in FIG. 2, the granular bed filter A comprises an ionizer section 10 and a filter section 12. As is indicated by arrows in the drawing, a gas stream to be treated enters the ionizer section 10 through an inlet 14 and then flows through the filter section 12 into an outlet plenum 16 which leads to an outlet port 18. The ionizer section 10 includes three ionizer disks 20 which are mounted on a rotatable shaft 22 disposed axially within the ionizer section 10. The disks 20 are provided with radially projecting needle electrodes such as 24 to which a high voltage is applied for creating a corona discharge which emanates from the needle tips, thereby electrically charging particulates entrained in the gas stream as described more fully in the earlier identified co-pending application. The filter section 12 includes, inter alia, an inner cylindrical louver cage 26 and an outer cylindrical louver cage 28 which respectively form inner and outer retaining structures for a tubular portion 30a of a granular bed. The granular bed also includes a lower portion 30b supported by a conical outlet hopper 32. The granular bed 30a, 30b continuously moves downward through the granular bed filter A, the movement of the bed being achieved by removing granules from the bed through an exit port 34 at the base of the conical outlet hopper 32 and supplying additional granules to the bed through a feed line 36 near the top of the granular bed filter A, above filter section 12. It will be noted that the gas flow path in filter section 12 is split, a portion of the gas stream flowing radially outward of the louver cage 26 through the tubular portion 30a of the granular bed, the remainder flowing through the lower portion 30b of the granular bed substantially in counterflow to the movement of the bed granules. For reasons to be addressed hereinafter, it is preferred that the filter section 12 be designed to provide a radial gas flow of approximately 80–90% of the gas stream and a counterflow of the remaining 10–20%.

As described in detail in the aforesaid co-pending application, electrification of the granular bed 30a, 30b is effected by a bed electrode 38 to which a high voltage is applied relative to the louver cages 26 and 28 which are grounded as shown in FIG. 3. The electric field created between the bed electrode 38 and the louver cages 26 and 28 polarizes the bed granules, causing the electrically charged particulates in the gas stream to adhere to the granules.

In accordance with the present invention, to remove a gaseous constituent from the gas stream, the granular bed filter A is supplied with granules coated with a thin layer of a sorbent material which is reactive with the gaseous constituent. As the gas stream passes through the granular bed as described earlier, it comes into intimate contact with the bed granules. The sorbent coating on the granules thus reacts with the undesired constituent of the gas stream to form a residue (reacted sorbent) which remains on the granules in the filter bed, thereby removing the constituent from the gas stream. Moreover, to great practical and economic advantage, particulate matter is simultaneously removed from the gas stream with high efficiency by virtue of the basic characteristics of the preferred granular bed filter. More specifically, particulates contained in the gas stream are retained in the filter bed by the "electromechanical freezing" effect described in U.S. Pat. No. 4,374,652, previously incorporated by reference. (Basically, this effect causes the granule-particulate mixture to move downwardly within the granular bed filter as a "frozen" or rigid plug.) Reacted sorbent material is similarly frozen in the filter bed. The electromechanical freezing effect generally permits the use of a wider range of granule flow rates through the filter bed and therefore provides broad sorbent usage rate capabilities.

Referring again to the apparatus of FIG. 1, the operation of peripheral components B–F will now be described. In the illustrated apparatus, granules coated with reacted sorbent and particulates removed from the gas stream flow from the outlet hopper 32 of granular bed filter A into an intake line 40 for a screw feeder B which controls the granule flow rate through the granular bed filter A. The outlet of screw feeder B is connected to a pneumatic lift line C which is supplied with low pressure air from a blower (so designated). The lift line C extends upwardly part way into a disengagement chamber D and conveys the screw feeder output thereto. The conveyance of the granule-particulate mixture through lift line C causes intense agitation of the mixture, effectively dislodging particulates and reacted sorbent from the granules. The now clean granules are gravitationally separated from the particulates and reacted sorbent material in the disengagement chamber D, the granules falling into a storage pile 42 in the lower portion of the disengagement chamber, below the upper extremity 44 of the lift line C, the particulates and reacted sorbent being conveyed to disposal by way of an outlet 46 located toward the top of the disengagement chamber.

After particulates and reacted sorbent are removed from the granules as just described, the granules are supplied to a mixer E through a feed line 54 connected to the base of the disengagement chamber D. In the mixer, the granules are coated with fresh sorbent material from a supply F, which may include the sorbent material in finely powdered form, for reuse in the granular bed filter A. (The coating process will be explained in detail later.) In the form shown, sorbent supply F is connected to a second screw feeder 48 which feeds a sorbent supply line 58 to the mixer E. The output of mixer E is delivered to the granular bed filter A through feed line 36.

Having described the method of the invention and disclosed preferred apparatus for its implementation, it is now appropriate to consider in detail the characteristics of the sorbent-coated granules. Thereafter, several methods and forms of apparatus for applying the sorbent coating will be addressed. It will be observed that the discussion hereinafter relating to specific sorbent materials is directed particularly to applications involving the removal of gaseous $SO_2$ from a gas stream, as for example in pollution control systems for coal-fired boilers. However, it is to be understood that the principles of the invention are by no means limited to such applications and may be used to great advantage in many other contexts (such as the control of chloride or fluoride emissions) by selecting appropriate sorbent materials.

With respect to the granules to be employed in apparatus for treating a gas stream in accordance with the invention, it will be appreciated that because the granules themselves need not partake in the sorbent-constituent reaction, they may be selected from a wide range of substances. Natural gravel is a preferred granular material for use according to the invention, since it is available in abundant supply and is quite inexpensive. In addition, gravel exhibits excellent mechanical properties for use in a granular bed filter of the type described hereinabove and permits operation at elevated filter bed temperatures. This allows the choice of operating temperature in the granular bed filter to be dictated primarily by reaction kinetics and not by material properties (as is the case with dry injection-baghouse systems, for example, where bag material properties limit operating temperatures). For granular bed filters of the type shown in FIG. 2, the preferred gravel size range is from about 1/16 in. to about 1 in. (about 16 mm to about 250 mm) in diameter. Larger granules provide less collection surface area, resulting in lower overall system efficiency and perhaps necessitating larger equipment to achieve desired results. Smaller granules, on the other hand, may result in excessive pressure drop across the filter bed and may require lower gas stream velocities through the filter bed to prevent "blowout" (i.e., entrainment of bed granules in the gas stream), also necessitating larger equipment. In applications of the apparatus of FIG. 1 for the removal of $SO_2$ from boiler waste gases, for example, preferred gravel size and gas velocity through the granular bed filter A are about $\frac{1}{4}$ inch (about 64 mm) diameter and about 100 feet (about 30.5 meters) per minute, respectively.

With respect to the coating to be applied to the gravel or other granular material selected, four considerations are particularly important for optimum system performance and economics. First, the thickness of the sorbent coating should be kept to a minimum to maximize the portion of the coating which is physically available for reaction. (It has been found that sorbent-constituent reactions are subject to "shell formation," whereby the outermost sorbent material reacts with the undesired constituent to form a reacted sorbent shell which effectively seals off underlying unreacted sorbent, making it unavailable for reaction.) Second, the coating should be uniformly applied to all gravel (or granule) surfaces to minimize the required size and gravel recycle rate of the granular bed filter and the associated costs. Third, the coating should be tightly adherent to the gravel (or granules) so that it remains substantially intact during handling prior to introduction into the granular bed filter as well as during passage through the filter. Finally, the sorbent reaction product preferably should be a solid which can be separated from the gravel (or granules) by pneumatic conveyance or other convenient means.

Naturally, insofar as specific sorbents are concerned, the choice of a sorbent material for a particular application will depend on a number of factors, such as reaction conditions (e.g., reaction temperature), usage rates and material cost. In connection with the removal of $SO_2$ from coal-fired boiler flue gases and the like, for example, alkali sorbents are generally suitable (usually providing an alkali-sulfate reaction product), but sodium and calcium-based materials are usually preferred on the basis of cost. For utility-scale applications in particular, cost considerations militate strongly toward the use of calcium-based sorbents. Sodium-based sorbents, which are somewhat more reactive but also more expensive, are generally better suited for industrial applications. In addition, it will be seen hereinafter that sodium-based sorbents, which unlike calcium-based sorbents are generally completely soluble in water, offer certain advantages in wet granule coating processes.

Examples of preferred calcium-based sorbent materials for boiler flue gas desulfurization and the like include hydrated lime, $Ca(OH)_2$, and calcined limestone (or lime), $CaO$. It is generally recognized that dry calcium-based sorbents exhibit low reactivity with $SO_2$ at temperatures of about 250°–300° F. (about 120°–150° C.) (the typical temperature range for power plant stack gases), with reactivity increasing with temperature. Therefore, with respect to utility-scale applications in particular, the foregoing sorbents are well suited for "hot side" flue gas treatment (i.e., treatment of the flue gas at the hot side of the air preheater), hot side temperatures typically being in the range of about 600°–650° F. (about 320°–345° C.) where sorbent reactivity is higher. It should be noted that this temperature range is below that where hydrated lime can be expected to dissociate into $CaO$ and $H_2O$, this generally requiring temperatures of about 800° F. (about 425° C.) or more.

With respect to sodium-based sorbents, preferred materials include sodium carbonate, $Na_2CO_3$, and sodium bicarbonate, $NaHCO_3$. As noted earlier, these sorbents are generally more costly than calcium-based sorbent materials, but their higher reactivity with $SO_2$ makes them an attractive alternative for many industrial flue gas desulfurization applications. Optimum reactivity of these materials occurs at about 400° F. (about 205° C.).

It will be appreciated, of course, that filter bed granules may be coated with mixtures of sodium and calcium-based sorbents in accordance with the invention.

Such mixtures offer a potentially significant advantage in applications involving wet granule coating methods (such as that which will be described in connection with FIG. 5). In particular, when granules are coated with a solution-slurry containing a sodium-calcium sorbent mix (the sodium sorbent being in solution form due to its high solubility in water, the calcium sorbent being in slurry form due to its lower solubility) and then dried, the precipitation of sodium sorbent onto the granule surfaces acts to bind the calcium sorbent material more tightly to the granules, thus providing a generally better adherent coating. A mixture of 80–90% hydrated lime and 10–20% sodium bicarbonate or sodium hydroxide (NaOH), for example, provides a sorbent coating which exhibits good reactivity with $SO_2$ while being relatively inexpensive due to the predominance of the cheaper hydrated lime.

With reference to FIGS. 4–6, attention will now be directed to several methods and apparatus for coating granules in accordance with the invention. It will be recalled that in the apparatus of FIG. 1, granules for use in the granular filter bed A are coated with sorbent in the mixer E. In the form shown in FIG. 4, the mixer E comprises a vessel 50 containing a bed of granules 52 which continuously moves downward through the vessel. Clean granules from the disengagement chamber D are supplied to the bed 52 through a feed line 54, while coated granules are removed from the bed through an exit port 56 located at the base of a conical outlet hopper 55 which forms the lower part of the vessel 50. As granules travel downward through the vessel 50, which is electrically grounded, they are electrified by a bed electrode (so designated) which is connected to a high voltage source as shown. The voltage applied to the bed electrode may be of the conventional order of magnitude for electrified granular bed filters.

Particles of dry sorbent material, preferably in fine powdered form (e.g., commercially available micron-sized hydrated lime powder), are supplied to the mixer E from sorbent supply F through a pneumatic feed line 58. As shown, the feed line 58 extends downward into the vessel 50 for dispersing the sorbent particles into the granular bed 52. The sorbent particles become triboelectrically charged in the feed line 58 and thus adhere to the electrified bed granules upon dispersion.

To ensure wide dispersion of the sorbent particles and thereby enhance coating uniformity, feed line 58 preferably discharges through an outwardly flared end 60. Further in this respect, it is also preferred that the flared end 60 be positioned for discharging sorbent particles into an agitated portion of the bed. In the form shown, the flared end is located in the lower portion of the bed 52, which is agitated as a result of the passage of the bed granules through the conical outlet hopper 55. Of course, any suitable means for agitating the granules can be used as desired (e.g., stirring paddles, screw augers, vibrating screens or fluidized beds). Finally, it will be observed that the pneumatic medium for conveying the sorbent particles to the mixer E flows upward through the bed 52 (as indicated by arrows in the drawing), exiting the vessel 50 through an exit port 62.

FIG. 5 illustrates a second form of apparatus for coating granules in accordance with the invention, with parts corresponding to those shown in FIG. 4 being designated by corresponding primed reference numerals. In this embodiment, which employs a wet coating method of the type alluded to previously, a liquid containing the selected sorbent is supplied to the mixer E' via a feed line 58'. Feed line 58' terminates at a spray nozzle (so designated) through which the liquid coating medium is applied to the granules in the bed 52'. The spray nozzle is preferably positioned within the vessel 50 for discharging the coating medium into the agitated portion of the granular bed in conical outlet hopper 55', as shown, to enhance coating uniformity. A hood or flared member 60' is attached near the end of feed line 58' and extends downward past the spray nozzle to provide clearance between the spray nozzle and the bed granules.

The bed granules in this case are heated to a temperature high enough to cause very rapid evaporation of the liquid from the applied coating medium. This results in the deposit of a thin sorbent coating on the granules. The heating of the granules can be accomplished by any means convenient for a particular application. It will be appreciated that for boiler flue gas desulfurization and the like, it is preferable that the granules be heated sufficiently to ensure that their temperature upon entering the granular bed filter A exceeds the acid dew point of the flue gas, typically 250°–350° F. (120°–175° C.) depending upon $SO_3$ concentration, to avoid acid condensation which may lead to equipment corrosion problems, although $SO_2$ removal is not significantly affected. In hot side utility boiler applications, for example, the granules will generally be of sufficient temperature as a result of their previous exposure to the hot flue gases.

It should be noted that in practice of the coating method of the present embodiment, it is frequently preferable to use a combination of sorbent materials in a solution-slurry (as opposed to a single material in a solution or slurry alone). As was described previously in connection with sodium and calcium-based sorbents, the precipitation of the sorbent supplied in solution form onto the bed granules as the liquid medium evaporates acts to bind the sorbent supplied in slurry form more tightly to the granules, providing a generally more adherent coating. (Due to handling considerations, it is preferred that calcium-based sorbent slurries not exceed approximately 30% solids with the apparatus just described.)

FIG. 6 shows a third form of apparatus for coating granules in accordance with the invention, with parts corresponding to those previously shown being designated by corresponding double primed reference numerals. In this embodiment, as in the embodiment of FIG. 4, the granular bed 52" is electrified by means of a bed electrode (so designated) and sorbent material is conveyed to the mixer E" through a pneumatic feed line 58" having a flared end 60" to ensure wide dispersion of the sorbent powder. In addition, however, it will be observed that feed line 58" contains a coaxial liquid line 59 which terminates at a spray nozzle (so designated) within the flared end 60" of the feed line. As the electrically charged sorbent particles are dispersed into the bed 52", the bed granules (which are heated and agitated as in the apparatus of FIG. 5) and sorbent particles are simultaneously sprayed with water (or other appropriate liquid) from liquid line 59. It will thus be appreciated that the present apparatus combines the electrostatic coating effect as was described with reference to FIG. 4 with a flash-drying coating effect similar to that described with reference to FIG. 5. The result is a uniform, tightly adherent sorbent coating on the granules removed from the bed 52". In addition, because water is fed in separately, slurry handling considerations are eliminated and the water flow rate can be determined independently of sorbent feed requirements.

With the preceding discussion in mind, several advantages of the invention in addition to those previously discussed will now be addressed in the context of $SO_2$ control (although it will be apparent that these advantages will be present in other applications of the invention). First, it will be appreciated that a granular bed filter used in accordance with the invention offers excellent mass transfer characteristics. More particularly, because the finely divided sorbent material is dispersed throughout the granular bed, waste gases can flow past the sorbent at relatively high velocities. This provides a thin gas boundary layer adjacent to the sorbent coating, with the result that diffusion of $SO_2$ from the gas stream to the sorbent will not be a rate-limiting factor. Also, the uniform distribution of sorbent throughout the granular bed ensures that all of the waste gas is exposed to non-reacted sorbent. This ensures high $SO_2$ removal efficiency.

The invention further provides the advantage of high sorbent utilization efficiency. In particular, the residence time of the granules within the granular bed filter may typically be on the order of one hour (which is considerably longer than the average residence times in baghouse sorbent reaction systems). This extended residence time helps to ensure that sorbent material is not prematurely removed from the granular bed for disposal. Further assurance against premature removal of sorbent material from the granular bed is provided by the counterflow portion of the gas stream through the lower part of the granular bed as mentioned previously. The gas stream counterflow (which is preferably about 10-20% of the waste gas stream) utilizes any unreacted sorbent that may still be present in the lower portion of the granular bed. Due to the depth of the granular bed in this region, the waste gas stream flows at a lower velocity, thus permitting efficient removal of $SO_2$ in spite of the reduced availability of unreacted sorbent.

For particular applications of a granular bed filter of the type described herein for the removal of $SO_2$ from waste gas streams, operating parameters (while not limiting) may be:

| | |
|---|---|
| Sorbent | Hydrated lime, calcined limestone, sodium carbonate/bicarbonate |
| Flue gas temperature | 200–800° F. (95–425° C.) |
| Flue gas velocity through filter bed | 15–150 fpm (4.6–45.7 mpm) |
| Filter bed depth (radial) | 6–24 in (15–61 cm) |
| Gravel feed rate | .1–1 lb/hr/acfm waste gas (1.3–13 gm/hr/acmm) |
| Sorbent/$SO_2$ stoichiometric ratio | .5–3 |
| Inlet $SO_2$ concentration | 10–20,000 ppm |

While the methods and apparatus of the invention have been shown and described in their preferred forms, it will be apparent to those skilled in the art that modifications may be made within the principles of the invention, the scope of which is defined in the appended claims. For example, multiple granular bed filter apparatus of the type shown may be used in parallel. In practice, a single unit may handle about 20,000–30,000 acfm (about 570–850 acmm) of flue gas for example.

We claim:

1. A metod of treating a gas stream containing a gaseous sulfur oxide constituent to be removed, comprising providing a granular bed filter, supplying to the bed of said filter granules of gravel having deposited thereon a coating of an alkali sorbent material reactive with said gaseous constituent, and passing said gas stream through said bed for contacting the gas stream with said sorbent material and for reacting said sorbent material with said gaseous constituent to substantially remove that constituent from said gas stream.

2. A method in accordance with claim 1, further comprising electrically charging particulates contained in said gas stream before it passes through the bed of said filter and electrifying said bed for collecting said particulates.

3. A method in accordance with claim 1, further comprising removing gravel granules from the bed of said filter after a portion of said gas stream has been in contact with the sorbent material, removing reacted sorbent material from the removed granules, depositing a coating of further sorbent material on said removed granules, and feeding those granules back to said bed.

4. A method in accordance with claim 3, wherein said removing of reacted sorbent material comprises agitating said removed granules, by pneumatically conveying the same, for dislodging reacted sorbent material therefrom.

5. A method in accordance with claim 1, wherein said gaseous constituent is sulfur dioxide and wherein said sorbent material comprises a material selected from the group consisting of hydrated lime ($Ca(OH)_2$), calcined limestone (CaO), sodium carbonate ($Na_2CO_3$), sodium bicarbonate ($NaHCO_3$) and mixtures thereof, said hydrated lime and calcined limestone being used with or without sodium hydroxide (NaOH) added thereto.

6. A method in accordance with claim 1, wherein said granules comprise gravel having a diameter in the range from about 1/16 inch to about 1 inch (about 16 mm to about 250 mm).

7. A method in accordance with claim 1, wherein said supplying of gravel granules comprises depositing a coating of said sorbent material on said granules in a further granular bed and delivering the coated granules to the bed of said filter.

8. A method in accordance with claim 7, wherein said depositing comprises electrostatically adhering particles of said sorbent material to said granules in said further granular bed.

9. A method in accordance with claim 7, wherein said depositing comprises dispersing particles of said sorbent material into an agitated portion of said further granular bed.

10. A method in accordance with claim 7, wherein said depositing comprises applying a liquid containing said sorbent material to said granules in said further bed and, prior to applying said liquid, heating those granules to a temperature which will cause said liquid to evaporate upon application thereto.

11. A method in accordance with claim 10, wherein said liquid is applied in an agitated portion of said further granular bed.

12. A method in accordance with claim 10, wherein said sorbent material comprises a first part in solution and a second part in a slurry.

13. A method in accordance with claim 7, wherein said depositing comprises dispersing electrically charged particles of said sorbent material into said further granular bed, applying a liquid to said granules and dispersed particles of sorbent material in said further granular bed and, prior to applying said liquid, heating those granules to a temperature which will cause said liquid to evaporate upon application thereto.

14. A method in accordance with claim 13, wherein said dispersing and applying are done in an agitated portion of said further granular bed.

15. A method in accordance with claim 13, wherein said depositing includes electrifying said granules in said further granular bed.

* * * * *